United States Patent
Sun et al.

(10) Patent No.: US 10,655,947 B2
(45) Date of Patent: May 19, 2020

(54) THICKNESS MEASURING METHOD AND DEVICE

(71) Applicant: BOE TECHNOLOGY GROUP CO., LTD., Beijing (CN)

(72) Inventors: Xuefei Sun, Beijing (CN); Chienhung Liu, Beijing (CN); Zhengliang Li, Beijing (CN); Bin Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 47 days.

(21) Appl. No.: 16/041,200

(22) Filed: Jul. 20, 2018

(65) Prior Publication Data
US 2019/0094011 A1    Mar. 28, 2019

(30) Foreign Application Priority Data
Sep. 22, 2017    (CN) ............ 2017 1 0866721

(51) Int. Cl.
*G01B 11/06*    (2006.01)
*G01N 21/552*    (2014.01)

(52) U.S. Cl.
CPC .......... *G01B 11/06* (2013.01); *G01B 11/0633* (2013.01); *G01N 21/553* (2013.01)

(58) Field of Classification Search
CPC .................... G01B 11/06; G01B 11/0633; G01B 9/02021; G01B 21/08; G01B 11/0616;
(Continued)

(56) References Cited

U.S. PATENT DOCUMENTS 4,877,301 A * 10/1989 Yokomori ............... G02B 6/13
385/37
5,075,551 A * 12/1991 Watanabe ............ G01N 21/552
250/341.3
(Continued)

FOREIGN PATENT DOCUMENTS

CA    1127864 A    7/1982
CN    1071004 A    4/1993
(Continued)

OTHER PUBLICATIONS

First Office Action; Application No. 201710866721.4; dated May 17, 2019; Engllish Translation Attached.

*Primary Examiner* — Mohamed K Amara
(74) *Attorney, Agent, or Firm* — Nath, Goldberg & Meyer; Joshua B. Goldberg

(57) ABSTRACT

The present disclosure provides a thickness measuring method and device. The thickness measuring method is used for measuring a thickness of a layer to be measured of a light-transmitting sample to be measured and comprising the steps of: placing the sample to be measured between an optical device and a metal layer, the optical device comprising a light incident surface and a light exit surface; adjusting incident light emitted to the light incident surface of the optical device so that an intensity of light exiting the light exit surface of the optical device is less than $10^{-12}$ W/m², so as to obtain optical parameters of the incident light; and calculating a thickness of the layer to be measured according to the optical parameters of the incident light.

18 Claims, 7 Drawing Sheets

(58) Field of Classification Search
CPC .......... G01B 7/06; G01B 15/02; G01B 11/22; G01B 17/02; G01B 9/02022; G01B 17/025; G01B 5/18; G01N 21/553; G01N 21/648; G01N 21/554; G01N 21/552; G01N 21/658; B24B 49/12; H01L 22/12; G02B 6/1226; G02B 5/008; G02B 5/04; G02B 6/34
See application file for complete search history.

(56) References Cited

U.S. PATENT DOCUMENTS

| | | | | |
|---|---|---|---|---|
| 5,125,740 A * | 6/1992 | Sato | ................ | G01N 21/43 356/128 |
| 5,327,225 A * | 7/1994 | Bender | ................ | G01N 21/553 250/307 |
| 5,434,411 A * | 7/1995 | Miyahara | ............ | G01N 21/552 250/339.07 |
| 5,822,073 A * | 10/1998 | Yee | ................ | G01N 21/553 356/445 |
| 5,991,488 A * | 11/1999 | Salamon | ............ | G01N 21/553 385/11 |
| 6,421,128 B1 * | 7/2002 | Salamon | ................ | G01N 21/33 356/445 |
| 6,483,959 B1 * | 11/2002 | Singh | ................ | G01N 21/0303 385/12 |
| 6,667,807 B2 * | 12/2003 | Lieberman | ........... | G01N 21/553 356/136 |
| 6,738,141 B1 * | 5/2004 | Thirstrup | ............ | G01N 21/553 356/445 |
| 6,807,323 B2 * | 10/2004 | Beom | .................... | B82Y 20/00 385/12 |
| 7,037,727 B1 * | 5/2006 | Miura | ................ | G01N 21/553 385/12 |
| 7,436,596 B2 * | 10/2008 | Robertson | ............ | G01N 21/553 359/587 |
| 8,004,676 B1 * | 8/2011 | Prasad | ................ | G01N 21/553 356/369 |
| 8,692,211 B2 * | 4/2014 | Robertson | .......... | G01N 21/6428 250/458.1 |
| 8,786,859 B2 * | 7/2014 | Lee | .................... | G01N 21/553 356/445 |
| 2003/0219809 A1 * | 11/2003 | Chen | .................... | G01N 21/553 506/4 |
| 2004/0113077 A1 * | 6/2004 | Franzen | ............... | G01N 21/553 250/338.1 |
| 2006/0269930 A1 * | 11/2006 | Robotti | ................ | G01N 21/553 435/6.11 |
| 2007/0099180 A1 * | 5/2007 | Robotti | ................ | B82Y 15/00 435/5 |
| 2007/0109551 A1 * | 5/2007 | Aiyer | ................ | G01B 11/0675 356/485 |
| 2007/0159633 A1 * | 7/2007 | Yin | ...................... | G01N 21/553 356/445 |
| 2007/0273883 A1 * | 11/2007 | Dickopf | ............... | G01N 21/253 356/445 |
| 2007/0273884 A1 * | 11/2007 | Matsushita | .......... | G01N 21/648 356/445 |
| 2007/0279635 A1 * | 12/2007 | Wu | ......................... | G01B 11/14 356/445 |
| 2008/0163688 A1 * | 7/2008 | Wang | .................... | G01N 21/553 73/580 |
| 2008/0218860 A1 * | 9/2008 | Robertson | ............ | G01N 21/553 359/534 |
| 2009/0021742 A1 * | 1/2009 | Furusawa | ............ | G01N 21/553 356/445 |
| 2011/0037981 A1 * | 2/2011 | Zhu | ...................... | G01N 21/553 356/369 |
| 2011/0188043 A1 * | 8/2011 | Davidov | ............... | G01N 21/553 356/445 |
| 2011/0312103 A1 * | 12/2011 | Fujimaki | ............... | G01N 21/554 436/501 |
| 2012/0069336 A1 * | 3/2012 | Rakitzis | ............... | G01N 21/211 356/369 |
| 2014/0370584 A1 * | 12/2014 | Kitagawa | ............... | G01N 21/03 435/287.9 |
| 2015/0204723 A1 * | 7/2015 | Zheng | .................... | G01N 21/41 356/369 |
| 2016/0178516 A1 * | 6/2016 | Abdulhalim | ......... | G01N 29/022 |
| 2018/0106724 A1 * | 4/2018 | Wang | ................ | G01N 21/3563 |

FOREIGN PATENT DOCUMENTS

| | | |
|---|---|---|
| CN | 101113887 A | 1/2008 |
| CN | 102478389 A | 5/2012 |
| CN | 104359412 A | 2/2015 |
| CN | 106091953 A | 11/2016 |
| CN | 106091954 A | 11/2016 |
| CN | 106403830 A | 2/2017 |
| CN | 106885787 A | 6/2017 |
| JP | 2004061141 A | 2/2004 |
| KR | 20080079435 A | 9/2008 |

* cited by examiner

THICKNESS MEASURING METHOD AND DEVICE

CROSS-REFERENCE TO RELATED APPLICATION

This application claims the priority of Chinese Patent Application No. 201710866721.4 submitted to the Chinese Intellectual Property Office on Sep. 22, 2017, the disclosure of which is incorporated herein in its entirety by reference.

TECHNICAL FIELD

The present disclosure relates to the technical field of thickness measurement, and particularly relates to a thickness measuring method and device.

BACKGROUND

During film preparation, a film thickness needs to be measured to monitor the film preparation process, because the film thickness is an important parameter and can directly affect physical properties of the film. Therefore, measurement of the film thickness is very important.

Currently, existing instruments commonly used for measuring a film thickness include ellipsometer, but ellipsometer is only suitable for measuring films having a thickness within a certain range. When the film thickness exceeds the range, sensitivity of the ellipsometer will be lowered, leading to a large error in the measurement result and thus affect the measurement accuracy.

SUMMARY

The present disclosure provides a thickness measuring method and device.

According to one aspect of the disclosure, there is provided a thickness measuring method for measuring a thickness of a layer to be measured of a light-transmitting sample to be measured and comprising the steps of:

placing the sample to be measured between an optical device and a metal layer, the optical device comprising a light incident surface and a light exit surface;

adjusting incident light emitted to the light incident surface of the optical device so that an intensity of light exiting from the light exit surface of the optical device is less than $10^{-12}$ W/m$^2$, so as to obtain optical parameters of the incident light; and calculating a thickness of the layer to be measured according to the optical parameters of the incident light.

The step of calculating a thickness of the layer to be measured according to the optical parameters of the incident light may include:

calculating an incident wave vector of the layer to be measured according to the optical parameters of the incident light;

calculating a reflectivity of a first interface and a reflectivity of a second interface of the layer to be measured, respectively, where the layer to be measured includes a first surface facing the optical device and a second surface facing the metal layer, the first surface is in contact with a first adjacent layer, the second surface is in contact with a second adjacent layer, the first interface is an interface between the layer to be measured and the first adjacent layer, and the second interface is an interface between the layer to be measured and the second adjacent layer; and calculating a thickness of the layer to be measured according to the incident wave vector of the layer to be measured and the reflectivities of the first and second interfaces of the layer to be measured.

The sample to be measured has a single layer structure and the whole sample to be measured is the layer to be measured, the optical device is the first adjacent layer, and the metal layer is the second adjacent layer;

the step of calculating an incident wave vector of the layer to be measured according to the optical parameters of the incident light may include:

calculating a vertical component of the incident wave vector of the layer to be measured according to a formula $K_n = \lambda \sqrt{\varepsilon_n(1-\sin\theta_n)}$, where $K_n$ is the vertical component of the incident wave vector of the layer to be measured, $\lambda$ is a wavelength of the incident light, $\theta_n$ is an incident angle of the light incident on the layer to be measured, and $\varepsilon_n$ is a dielectric constant of the layer to be measured.

The step of respectively calculating a reflectivity of a first interface and a reflectivity of a second interface of the layer to be measured may include:

calculating a reflectivity of an interface between the optical device and the layer to be measured according to a formula $$r_{pn} = \frac{\varepsilon_n K - \varepsilon_p K_n}{\varepsilon_n K + \varepsilon_p K_n},$$

where $r_{pn}$ is the reflectivity of the interface between the optical device and the layer to be measured, $K_n$ is the vertical component of the incident wave vector of the layer to be measured, $K$ is a vertical component of the incident wave vector of the optical device, $\varepsilon_p$ is a dielectric constant of the optical device, and $\varepsilon_n$ is a dielectric constant of the layer to be measured; and calculating a reflectivity of an interface between the layer to be measured and the metal layer according to a formula $$r_{nj} = \frac{\varepsilon_j K_n - \varepsilon_n K_j}{\varepsilon_j K_n + \varepsilon_n K_j},$$

where $r_{nj}$ is the reflectivity of the interface between the layer to be measured and the metal layer, $K_j$ is a vertical component of the incident wave vector of the metal layer, and $\varepsilon_j$ is a dielectric constant of the metal layer.

The step of calculating a thickness of the layer to be measured according to the incident wave vector of the layer to be measured and the reflectivities of the first and second interfaces of the layer to be measured may include:

calculating the thickness of the layer to be measured according to a formula $$d_n = -i \frac{\ln\left|\frac{-1}{r_{pn} r_{nj}}\right|}{2K_n},$$

where $d_n$ is the thickness of the layer to be measured, and $i$ is an imaginary unit.

The sample to be measured has a multi-layer structure, and the layer to be measured is located at an outermost layer of the sample to be measured;

the sample to be measured is placed between the optical device and the metal layer so that the layer to be measured is in contact with the metal layer;

a layer of the sample to be measured adjacent to the layer to be measured is the first adjacent layer, and the metal layer is the second adjacent layer.

The step of calculating an incident wave vector of the layer to be measured according to the optical parameters of the incident light may include:

calculating a vertical component of the incident wave vector of the layer to be measured according to a formula $K_n = \lambda_m \sqrt{\varepsilon_n(1-\sin\theta_n)}$, where $K_n$ is the vertical component of the incident wave vector of the layer to be measured, $\lambda_m$ is an incident wavelength of the first adjacent layer, $\theta_n$ is an incident angle of the light incident on the layer to be measured, and $\varepsilon_n$ is a dielectric constant of the layer to be measured.

The step of respectively calculating a reflectivity of a first interface and a reflectivity of a second interface of the layer to be measured may include:

calculating a reflectivity of an interface between the first adjacent layer and the layer to be measured according to a formula $$r_{mn} = \frac{\varepsilon_n K_m - \varepsilon_m K_n}{\varepsilon_n K_m + \varepsilon_m K_n},$$

where $r_{mn}$ is the reflectivity of the interface between the first adjacent layer and the layer to be measured, $K_m$ is a vertical component of the incident wave vector of the first adjacent layer, $K_n$ is a vertical component of the incident wave vector of the layer to be measured, $\varepsilon_n$ is a dielectric constant of the layer to be measured, and $\varepsilon_m$ is a dielectric constant of the first adjacent layer; and calculating a reflectivity of an interface between the layer to be measured and the metal layer according to a formula $$r_{nj} = \frac{\varepsilon_j K_n - \varepsilon_n K_j}{\varepsilon_j K_n + \varepsilon_n K_j},$$

where $r_{nj}$ is the reflectivity of the interface between the layer to be measured and the metal layer, $K_j$ is a vertical component of the incident wave vector of the metal layer, and $\varepsilon_j$ is a dielectric constant of the metal layer.

The step of calculating a thickness of the layer to be measured according to the incident wave vector of the layer to be measured and the reflectivities of the first and second interfaces of the layer to be measured may include:

calculating the thickness of the layer to be measured according to a formula $$d_n = -i \frac{\ln\left|\frac{-1}{r_{mn}r_{nj}}\right|}{2K_n},$$

where $d_n$ is the thickness of the layer to be measured, and $i$ is an imaginary unit.

According to another aspect of the disclosure, there is provided a thickness measuring device for measuring a thickness of a layer to be measured of a light-transmitting sample to be measured and comprising:

an optical device and a metal layer disposed oppositely, the optical device comprising a light incident surface and a light exit surface;

an emitter corresponding to the light incident surface of the optical device and configured to emit incident light toward the light incident surface;

a receiver corresponding to the light exit surface of the optical device and configured to receive an intensity of light exiting from the light exit surface;

an acquirer configured to acquire optical parameters of the incident light from the emitter in a case where the receiver receives an intensity of light exiting from the light exit surface less than $10^{-12}$ W/m$^2$; and a calculator configured to calculate a thickness of the layer to be measured according to the optical parameters of the incident light.

The calculator may include:

a first computing component configured to calculate an incident wave vector of the layer to be measured according to the optical parameters of the incident light;

a second computing component configured to calculate a reflectivity of a first interface and a reflectivity of a second interface of the layer to be measured, respectively, where the layer to be measured includes a first surface facing the optical device and a second surface facing the metal layer, the first surface is in contact with a first adjacent layer, the second surface is in contact with a second adjacent layer, the first interface is an interface between the layer to be measured and the first adjacent layer, and the second interface is an interface between the layer to be measured and the second adjacent layer; and a third computing component configured to calculate a thickness of the layer to be measured according to the incident wave vector of the layer to be measured obtained by the first computing component and the reflectivities of the first and second interfaces of the layer to be measured obtained by the second computing component.

When the sample to be measured has a single layer structure and the whole sample to be measured is the layer to be measured, the optical device is the first adjacent layer, and the metal layer is the second adjacent layer;

The first computing component is configured to calculate a vertical component of the incident wave vector of the layer to be measured according to a formula $K_n = \lambda\sqrt{\varepsilon_n(1-\sin\theta_n)}$, where $K_n$ is the vertical component of the incident wave vector of the layer to be measured, $\lambda$ is a wavelength of the incident light, $\theta_n$ is an incident angle of the light incident on the layer to be measured, and $\varepsilon_n$ is a dielectric constant of the layer to be measured.

The second computing component may include:

a first computing sub-component configured to calculate a reflectivity of an interface between the optical device and the layer to be measured according to a formula $$r_{pn} = \frac{\varepsilon_n K - \varepsilon_p K_n}{\varepsilon_n K + \varepsilon_p K_n},$$

where $r_{pn}$ is the reflectivity of the interface between the optical device and the layer to be measured, $K_n$ is a vertical component of the incident wave vector of the layer to be measured, $K$ is a vertical component of the incident wave vector of the optical device, $\varepsilon_p$ is a dielectric constant of the optical device, and $\varepsilon_n$ is a dielectric constant of the layer to be measured; and a second computing sub-component configured to calculate a reflectivity of an interface between the layer to be measured and the metal layer according to a formula $$r_{nj} = \frac{\varepsilon_j K_n - \varepsilon_n K_j}{\varepsilon_j K_n + \varepsilon_n K_j},$$

where $r_{nj}$ is the reflectivity of the interface between the layer to be measured and the metal layer, $K_j$ is a vertical component of the incident wave vector of the metal layer, and $\varepsilon_j$ is a dielectric constant of the metal layer.

The third computing component may be configured to calculate the thickness of the layer to be measured according to a formula $$d_n = -i \frac{\ln \left| \frac{-1}{r_{pn} r_{nj}} \right|}{2K_n},$$

where $d_n$ is the thickness of the layer to be measured, and i is an imaginary unit.

The sample to be measured may have a multi-layer structure, and the layer to be measured is located at an outermost layer of the sample to be measured, the layer to be measured is in contact with the metal layer, a layer of the sample to be measured adjacent to the layer to be measured is the first adjacent layer, and the metal layer is the second adjacent layer;

the first computing component is configured to calculate a vertical component of the incident wave vector of the layer to be measured according to a formula $K_n = \lambda_m \sqrt{\varepsilon_n (1 - \sin\theta_n)}$, where $K_n$ is the vertical component of the incident wave vector of the layer to be measured, $\lambda_m$ is an incident wavelength of the first adjacent layer, $\theta_n$ is an incident angle of the light incident on the layer to be measured, and $\varepsilon_n$ is a dielectric constant of the layer to be measured.

The second computing component may include:

a third computing sub-component configured to calculate a reflectivity of an interface between the first adjacent layer and the layer to be measured according to a formula $$r_{mn} = \frac{\varepsilon_n K_m - \varepsilon_m K_n}{\varepsilon_n K_m + \varepsilon_m K_n},$$

where $r_{mn}$ is the reflectivity of the interface between the first adjacent layer and the layer to be measured, $K_m$ is a vertical component of the incident wave vector of the first adjacent layer, $K_n$ is a vertical component of the incident wave vector of the layer to be measured, $\varepsilon_n$ is a dielectric constant of the layer to be measured, and $\varepsilon_m$ is a dielectric constant of the first adjacent layer; and a fourth computing sub-component configured to calculate a reflectivity of an interface between the layer to be measured and the metal layer according to a formula $$r_{nj} = \frac{\varepsilon_j K_n - \varepsilon_n K_j}{\varepsilon_j K_n + \varepsilon_n K_j},$$

where $r_{nj}$ is the reflectivity of the interface between the layer to be measured and the metal layer, $K_j$ is a vertical component of the incident wave vector of the metal layer, and $\varepsilon_j$ is a dielectric constant of the metal layer.

The third computing component may be configured to calculate the thickness of the layer to be measured according to a formula $$d_n = -i \frac{\ln \left| \frac{-1}{r_{mn} r_{nj}} \right|}{2K_n},$$

where $d_n$ is the thickness of the layer to be measured, and i is an imaginary unit.

The optical device may be a prism.

The metal layer may be made of any one or more metal materials selected from the group consisting of gold, silver, aluminum, copper, nickel, platinum, palladium, zinc and cadmium.

The incident light may be emitted onto a metal surface of the metal layer to excite surface plasmon resonance so that the intensity of light exiting from the light exit surface is less than $10^{-12}$ W/m$^2$.

DETAILED DESCRIPTION

The present disclosure will now be further described in detail below in conjunction with the drawings and exemplary embodiments.

Figure 1:
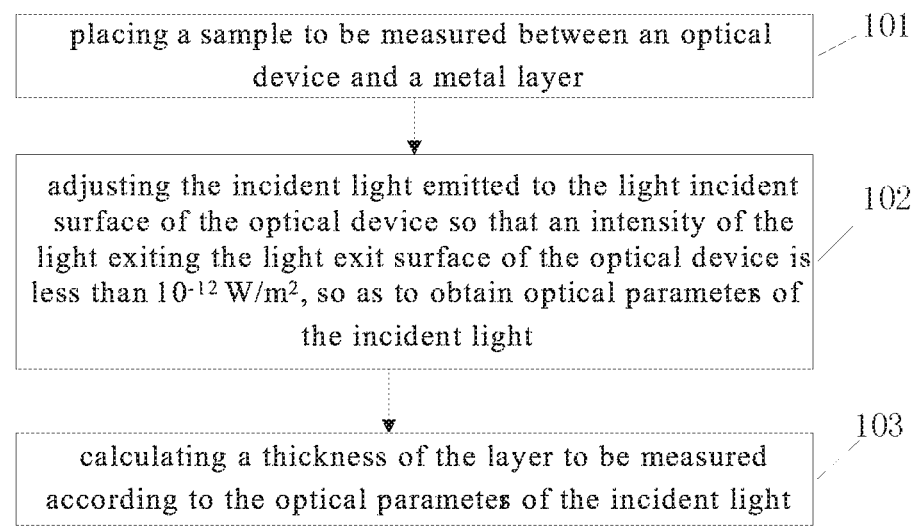
FIG. 1 is a flowchart of a thickness measuring method according to an exemplary embodiment of the disclosure.

According to one aspect of the disclosure, as shown in FIG. 1, there is provided a thickness measuring method for measuring a thickness of a layer to be measured of a light-transmitting sample to be measured and comprising steps S101-S103.

In the step of S101, placing the sample to be measured between an optical device and a metal layer.

In an exemplary embodiment of the disclosure, the optical device includes a light incident surface and a light exit surface; the optical device may be a prism, or, for example, a device composed of two pieces of glass intersecting at an angle. The incident light is incident from the light incident surface of the optical device and refracted to the sample to be measured. The light is transmitted through the sample to be measured to the metal layer. When reflected on a surface of the metal layer, the light is reflected to and then exits the light exit surface of the optical device. The incident light may be emitted by a light emitting device, and the component emitting light in the light emitting device is equivalent to an emitter. The emitter emits light of a certain wavelength and irradiated to the light incident surface of the optical device at a certain incident angle. Light exiting from the light exit surface of the optical device may be received by a receiver to detect an intensity of the emitted light. Specifically, the emitter may be a laser, more specifically, a gas laser, a solid laser, a semiconductor laser, a dye laser, a free electron laser, or the like. In this case, the receiver may be a laser detector. Or, the emitter may be a combination of a light emitting diode and a condenser, in which case the receiver may be a photodetector or the like.

The metal layer may be a metal plate. The incident light is incident from the light incident surface of the optical device, refracted to the sample to be measured, and then transmitted through the sample to be measured to the metal surface of the metal layer, which causes collective oscillation of free electrons on the metal surface, resulting in surface plasmons. When a component of a wave vector of the incident light on the metal surface in an interface direction is equal to a component of a wave vector of a surface plasma wave along an interface direction, metal surface plasmon resonance is excited. At this time, all or almost all the incident light is absorbed. In this way, the light exiting from the light exit surface of the optical device is within a range of light intensity that is not perceivable by human eyes. Then, step 102 is performed based on the metal surface plasmon resonance principle.

In the step of S102, adjusting the incident light emitted to the light incident surface of the optical device so that an intensity of the light exiting from the light exit surface of the optical device is less than $10^{-12}$ W/m$^2$, so as to obtain optical parameters of the incident light.

When the intensity of the light exiting the light exit surface of the optical device is less than $10^{-12}$ W/m$^2$, the emitted light cannot be seen or perceived by human eyes, which means that when the incident light incident on the light incident surface of the optical device penetrates the sample to be measured to the metal surface of the metal layer, the metal surface plasmon resonance is excited. Light energy of the incident light is converted into collective vibration energy of the free electrons on the metal surface. As the light energy of the incident light is gradually depleted, light that can be reflected on the metal surface completely or almost completely disappears, and the intensity of light exiting the light exit surface of the optical device is between 0 and $10^{-12}$ W/m$^2$ and less than $10^{-12}$ W/m$^2$. In this case, optical parameters of the incident light, such as a wavelength and an incident angle of the incident light, are obtained.

In an exemplary embodiment of the disclosure, the incident light may be adjusted in the following two ways: one is to emit incident light with a fixed wavelength by the emitter, and adjust the incident angle of the incident light until the intensity of light exiting the light exit surface of the optical device is less than $10^{-12}$ W/m$^2$; the other is to fix the incident angle of the incident light, and adjust the wavelength of the incident light until the intensity of light exiting the light exit surface of the optical device is less than $10^{-12}$ W/m$^2$.

In the step of S103, calculating a thickness of the layer to be measured according to the optical parameters of the incident light.

Figure 2:
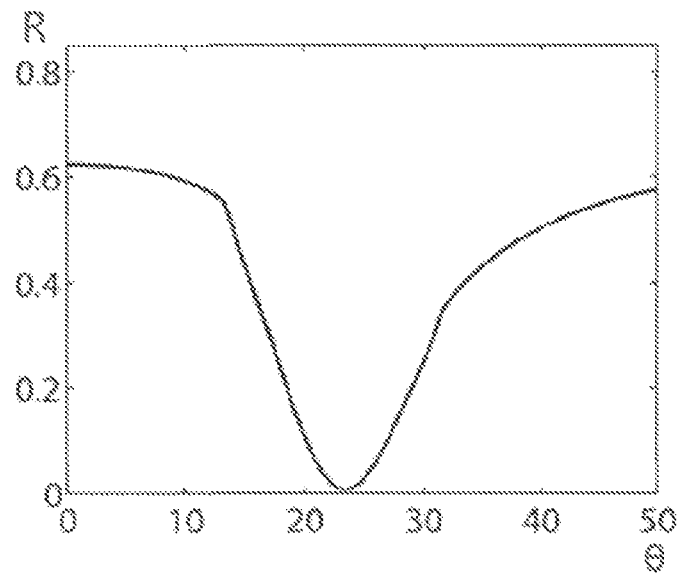
FIG. 2 is a graph showing a relationship between the reflectivity and the resonance absorption angle.

When the incident light is emitted onto the metal surface of the metal layer to excite the surface plasmon resonance, a reflectivity of the metal surface is approximately zero, and a light intensity of the light exiting the light exit surface of the optical device is less than $10^{-12}$ W/m$^2$. FIG. 2 shows a relationship between the reflectivity R of the metal surface and the resonance absorption angle θ. The resonance absorption angle θ changes as the incident angle or wavelength of the incident light is adjusted. The resonance absorption angle θ is an incident angle of the light emitted on the metal surface. As shown in FIG. 2, when the resonance absorption angle θ reaches a certain value, the surface plasmon resonance is excited, and the reflectivity R is approximately zero. Based on this principle, the thickness of the layer to be measured is derived from a relationship among optical reflection, refraction vector and incident vector, for example, using the Fresnel formula, a reflection coefficient formula of three-layer medium, with a wavelength and an incident angle of the incident light as initial parameter values, as well as from relevant and known parameters, such as a dielectric constant, of each medium from the optical device to the metal layer.

Figure 3:
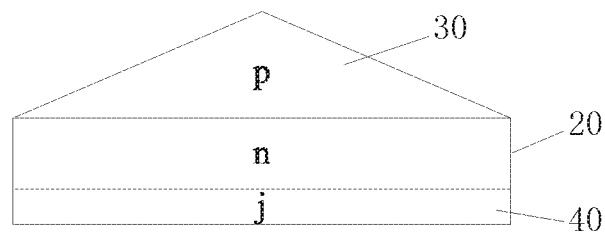
FIG. 3 is a schematic view showing a configuration of the sample to be measured having a single layer structure and being placed between the optical device and the metal layer according to an exemplary embodiment of the disclosure.
Figure 4:
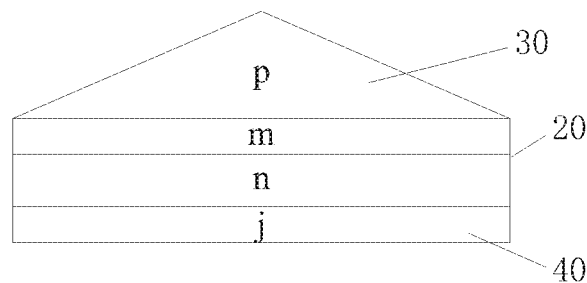
FIG. 4 is a schematic view showing a configuration of the sample to be measured having a multi-layer structure and being placed between the optical device and the metal layer according to an exemplary embodiment of the disclosure.
Figure 5:
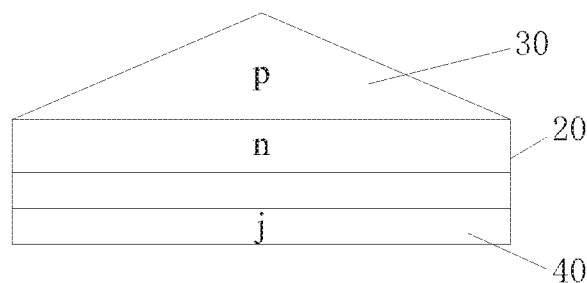
FIG. 5 is a schematic view showing another configuration of the sample to be measured having a multi-layer structure and being placed between the optical device and the metal layer according to an exemplary embodiment of the disclosure.
Figure 6:
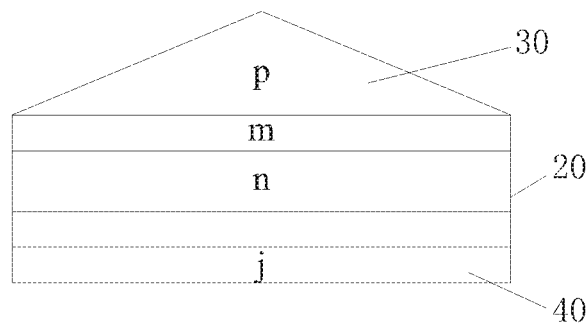
FIG. 6 is a schematic view showing yet another configuration of the sample to be measured having a multi-layer structure and being placed between the optical device and the metal layer according to an exemplary embodiment of the disclosure.

In an exemplary embodiment of the disclosure, the media from the optical device to the metal layer include the following three situations: the first situation is that, as shown in FIG. 3, the sample to be measured 20 has a single layer structure, the whole sample to be measured 20 is a layer to be measured n. Thus, from the optical device 30 to the metal layer 40, there is the optical device 30, the layer to be measured n and the metal layer 40. The second situation is that, as shown in FIGS. 4 and 5, the sample to be measured 20 has a multi-layer structure, and the layer to be measured n is located at an outermost layer of the sample to be measured 20, which includes two situations: as shown in FIG. 4, the layer to be measured n is adjacent to the metal layer 40; or as shown in FIG. 5, the layer to be measured n is adjacent to the optical device 30. The third situation is that, as shown in FIG. 6, the sample to be measured 20 has a multi-layer structure, the layer to be measured n is located in a layer between outermost layers of two sides of the sample to be measured 20, and when the sample to be measured 20 is placed between the optical device 30 and the metal layer 40, either of the outermost layers of two sides of the sample to be measured 20 is in contact with the metal layer 40 or the optical device 30.

When calculating the thickness of the layer to be measured, the reflection coefficient formula of three-layer medium used is:

$$r_{123} = \frac{r_{12} + r_{23}e^{i2K_2d_2}}{1 + r_{12}r_{23}e^{i2K_2d_2}},$$

when the metal surface plasmon resonance occurs, the denominator in the formula is zero, a relationship between a thickness $d_2$ of a layer adjacent to the metal layer and reflectivities $r_{12}$, $r_{23}$ of upper and lower interfaces of the layer is derived, and the thickness of the layer to be measured is derived and calculated according to a relationship among optical reflection, refraction vector and incident vector and relevant and known parameters of each medium from the optical device to the metal layer. The sample to be measured may be a film, but is not limited thereto. The thickness of the layer to be measured may be measured by the thickness measuring method of the exemplary embodiment as long as the sample is light transmittable.

The thickness measuring method provided in the exemplary embodiment of the disclosure is used for measuring a thickness of a layer to be measured of a light-transmitting sample to be measured. In the method, the sample to be measured is placed between an optical device and a metal layer, incident light emitted to the light incident surface of the optical device is adjusted so that an intensity of light exiting the light exit surface of the optical device is less than $10^{-12}$ W/m$^2$, thus all or almost all the light energy of the incident light interacts with free electrons on the metal surface of the metal layer to excite the metal surface plasmon resonance, and the thickness of the layer to be measured of the sample to be measured is derived and calculated according to the metal surface plasmon resonance principle and the optical parameters of the incident light, as well as optical formulas among reflection, refraction and incidence. In that, despite the thickness, the layer to be measured of any thickness may be obtained by the principle of exciting the metal surface plasmon resonance by incident light, and the thickness of the layer to be measured may be derived and calculated according to optical formulas among reflection, refraction and incidence. Compared with current measuring methods, this method can obtain a more accurate result and a higher precision.

Figure 7:
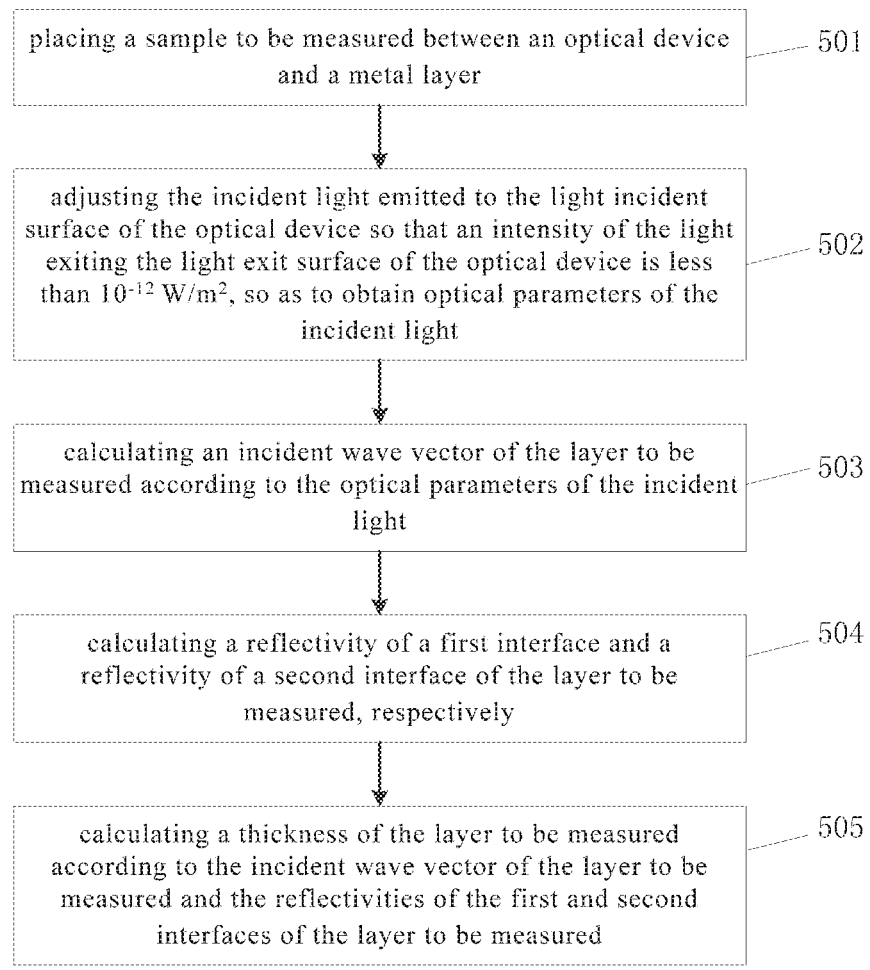
FIG. 7 is a flowchart of another thickness measuring method according to an exemplary embodiment of the disclosure.

Referring to the above, the exemplary embodiment of the disclosure further provides another thickness measuring method for measuring a thickness of a layer to be measured of a light-transmitting sample to be measured. As shown in FIG. 7, the method comprises steps S501-S505.

In the step of S501, placing the sample to be measured between an optical device and a metal layer.

In this step, the sample to be measured, the optical device, and the metal layer are the same as those described in step S101 of the above exemplary embodiment, thus will not be repeated here. For details, please refer to the description in step S101.

In the step of S502, adjusting incident light emitted to the light incident surface of the optical device so that an intensity of the light exiting the light exit surface of the optical device is less than $10^{-12}$ W/m$^2$, so as to obtain optical parameters of the incident light.

In this step, the adjustment of the incident light and how to obtain optical parameters of the incident light when the intensity of emitted light is less than $10^{-12}$ W/m$^2$ are the same as those described in step S102 of the above exemplary embodiment, thus will not be repeated here. For details, please refer to the description in step S102.

In the step of S503, calculating an incident wave vector of the layer to be measured according to the optical parameters of the incident light.

The thickness of the layer to be measured is derived and calculated from a relationship among optical reflection, refraction vector and incident vector, for example, using the Fresnel formula, and the reflection coefficient formula of three-layer medium, with the optical parameters, such as a wavelength and an incident angle, of the incident light as initial parameter values, as well as from relevant and known parameters, such as a dielectric constant, of each medium from the optical device to the metal layer.

In the step of S504, calculating a reflectivity of a first interface and a reflectivity of a second interface of the layer to be measured, respectively.

In the exemplary embodiment of the disclosure, the layer to be measured includes a first surface facing the optical device and a second surface facing the metal layer, the first surface is in contact with a first adjacent layer, the second surface is in contact with a second adjacent layer, the first interface is an interface between the layer to be measured and the first adjacent layer, and the second interface is an interface between the layer to be measured and the second adjacent layer. For situations of each medium from the optical device to the metal layer, please refer to FIGS. 3 to 6, which are the same as those described in the above exemplary embodiment, thus will not be repeated here.

The reflectivities of the first and second interfaces are derived and calculated according to a relationship among optical reflection, refraction vector and incident vector, for example, using the Fresnel formula, and the reflection coefficient formula of three-layer medium.

In the step of S505, calculating a thickness of the layer to be measured according to the incident wave vector of the layer to be measured and the reflectivities of the first and second interfaces of the layer to be measured.

When the incident light is emitted onto the metal surface of the metal layer to excite the surface plasmon resonance, the reflectivity of the metal surface is approximately zero, which may be regarded as no reflection. Based on this principle, according to the reflection coefficient formula of three-layer medium:

$$r_{123} = \frac{r_{12} + r_{23}e^{i2K_2d_2}}{1 + r_{12}r_{23}e^{i2K_2d_2}},$$

when the metal surface plasmon resonance occurs, the denominator in the formula is zero, a relationship between a thickness $d_2$ of a layer adjacent to the metal layer and reflectivities $r_{12}$, $r_{23}$ of upper and lower interfaces of the layer is derived, and the thickness of the layer to be measured is derived and calculated from the reflectivities of the first and second interfaces obtained according to a relationship among optical reflection, refraction vector and incident vector and in combination with step S504, and relevant and known parameters, such as a dielectric constant, of each medium from the optical device to the metal layer.

According to the thickness measuring method provided in the exemplary embodiment of the disclosure, placing the sample to be measured between an optical device and a metal layer, adjusting incident light emitted to the light incident surface of the optical device so that an intensity of light exiting the light exit surface of the optical device is less than $10^{-12}$ W/m$^2$, thus all or almost all the incident light is absorbed to excite the metal surface plasmon resonance, and deriving and calculating the incident wave vector of the layer to be measured, and the reflectivities of the first and second interfaces successively, and finally deriving and calculating the thickness of the layer to be measured of the sample to be measured using the metal surface plasmon resonance principle and the optical parameters of the incident light, and according to optical formulas among reflection, refraction and incidence. In that, despite the thickness, the layer to be measured of any thickness may be obtained by the principle of exciting the metal surface plasmon resonance by incident light, and the thickness of the layer to be measured may be derived and calculated according to optical formulas among reflection, refraction and incidence. Compared with current measuring methods, this method can obtain a more accurate result and a higher precision.

Figure 8:
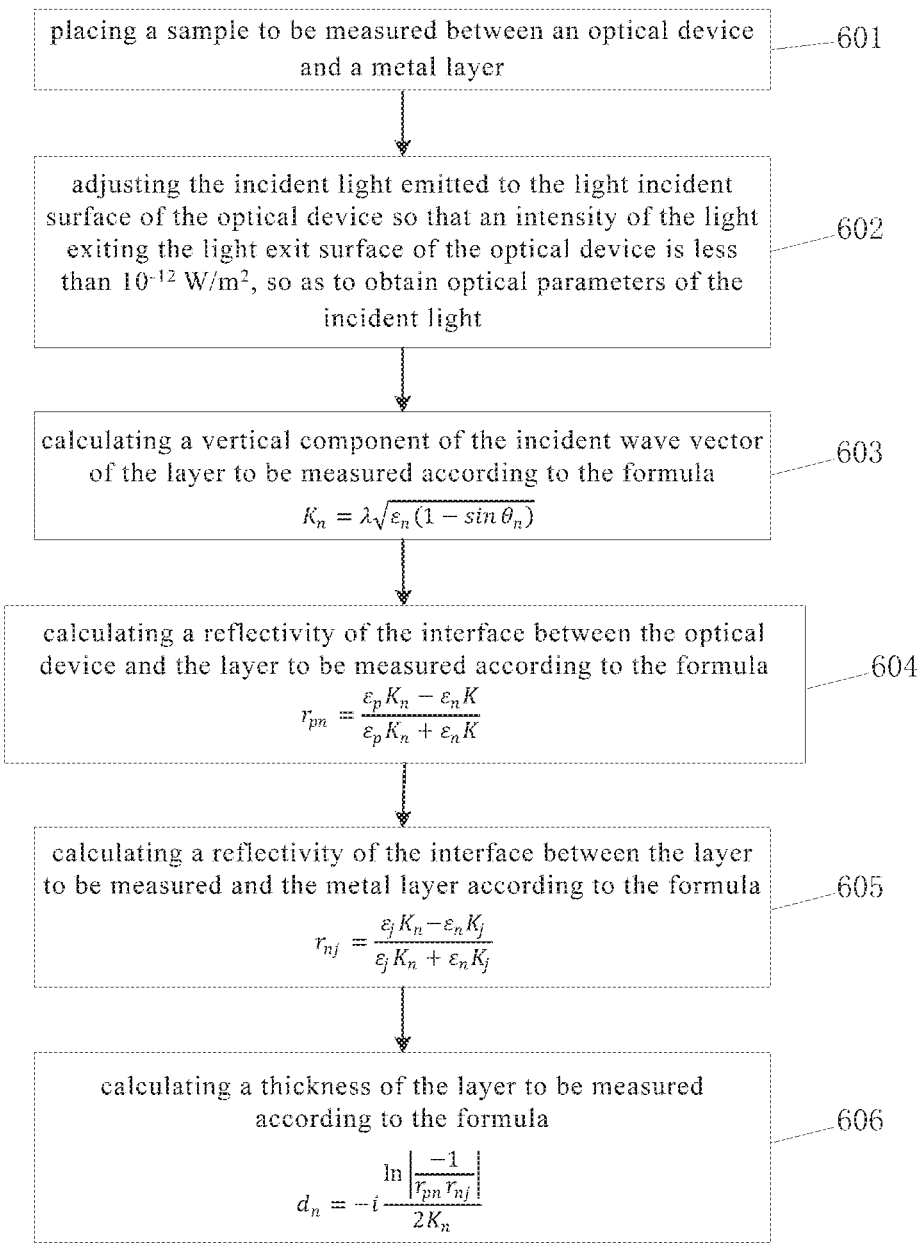
FIG. 8 is a flowchart of yet another thickness measuring method according to an exemplary embodiment of the disclosure.

In the configuration of FIG. 3, the sample to be measured has a single layer structure and the whole sample to be measured is the layer to be measured, the optical device is a first adjacent layer, and the metal layer is a second adjacent layer. The exemplary embodiment of the disclosure further provides a thickness measuring method. As shown in FIG. 8, the method comprises steps S601-S606.

In the step of S601, placing the sample to be measured between an optical device and a metal layer.

In the step of S602, adjusting incident light emitted to the light incident surface of the optical device so that an intensity of light exiting the light exit surface of the optical device is less than $10^{-12}$ W/m$^2$, so as to obtain optical parameters of the incident light.

Details of steps S601 and S602 are the same as those of steps S501 and S502 in the above exemplary embodiment, thus will not be repeated here.

In the step of S603, calculating a vertical component of the incident wave vector of the layer to be measured according to the formula $K_n = \lambda \sqrt{\varepsilon_n(1-\sin\theta_n)}$.

Where $K_n$ is the vertical component of the incident wave vector of the layer to be measured, i.e., a component of the incident wave vector of the layer to be measured in a direction vertical to a surface of the layer to be measured, $\lambda$ is a wavelength of the incident light, $\theta_n$ is an incident angle of the light incident on the layer to be measured, and $\varepsilon_n$ is a dielectric constant of the layer to be measured.

Based on the Fresnel reflection coefficient formula r=Er/Ei, where r is the reflection coefficient, Er is the reflected wave electric field strength, and Ei is the incident wave electric field strength, a relationship between the optical reflection vector and incident vector is obtained. Since all or almost all the incident light is absorbed, the reflection coefficient of the layer to be measured is approximately zero, thereby deriving a calculation formula $K_n = \lambda \sqrt{\varepsilon_n(1-\sin\theta_n)}$ for obtaining the vertical component of the incident wave vector of the layer to be measured. According to a formula $n_1 \sin\theta = n_2 \sin\theta_n$, where $n_1$ is a refractive index of air, $n_2$ is a refractive index of the optical device, and $\theta$ is the incident angle of the incident light, $\sin\theta_n$ is calculated and then substituted into the above equation to obtain the vertical component $K_n$ of the incident wave vector of the layer to be measured.

In the step of S604, calculating a reflectivity of the interface between the optical device and the layer to be measured according to the formula $$r_{pn} = \frac{\varepsilon_n K - \varepsilon_p K_n}{\varepsilon_n K + \varepsilon_p K_n}.$$

Where $r_{pn}$ is the reflectivity of the interface between the optical device and the layer to be measured, $K_n$ is a vertical component of the incident wave vector of the layer to be measured, K is a vertical component of the incident wave vector of the optical device, i.e., a component of the wave vector of the incident light in a direction vertical to the light incident surface, $\varepsilon_p$ is a dielectric constant of the optical device and $\varepsilon_n$ is a dielectric constant of the layer to be measured.

In the step of S605, calculating a reflectivity of the interface between the layer to be measured and the metal layer according to the formula $$r_{nj} = \frac{\varepsilon_j K_n - \varepsilon_n K_j}{\varepsilon_j K_n + \varepsilon_n K_j}.$$

Where $r_{nj}$ is the reflectivity of the interface between the layer to be measured and the metal layer, $K_j$ is the vertical component of the incident wave vector of the metal layer, i.e., a component of the incident wave vector of the metal layer in a direction vertical to a surface of the metal layer, and $\varepsilon_j$ is a dielectric constant of the metal layer.

The order of steps S604 and S605 is not specifically defined. The above two formulas are other expressions of the basic formula of the Fresnel reflection coefficient. The vertical component K of the incident wave vector of the optical device numerically equals to the wavelength $\lambda$ of the incident light. For the vertical component $K_j$ of the incident wave vector of the metal layer, since the reflectivity of the metal surface is approximately zero during the metal surface plasmon resonance of the metal layer, the value of $K_j$ may be zero or a near-zero decimal to represent that no reflection occurs on the metal surface. The vertical component K of the incident wave vector of the optical device, the vertical component $K_j$ of the incident wave vector of the metal layer, the vertical component $K_n$ of the incident wave vector of the layer to be measured obtained in step S603, and the dielectric constant required in the formula are substituted into the above two formulas respectively to obtain the reflectivities of the first and second interfaces of the layer to be measured, respectively, i.e., a reflectivity $r_{pn}$ of the interface between the optical device and the layer to be measured and a reflectivity $r_{nj}$ of the interface between the layer to be measured and the metal layer.

In the step of S606, calculating a thickness of the layer to be measured according to the formula $$d_n = -i\frac{\ln\left|\frac{-1}{r_{pn}r_{nj}}\right|}{2K_n}.$$

Where $d_n$ is the thickness of the layer to be measured. According to the reflection coefficient formula of three-layer medium $$r_{123} = \frac{r_{12} + r_{23}e^{i2K_2 d_2}}{1 + r_{12}r_{23}e^{i2K_2 d_2}},$$

when the metal surface plasmon resonance occurs, the denominator in the formula is zero, and a relationship between a thickness $d_2$ of a layer adjacent to the metal layer and reflectivities $r_{12}$, $r_{23}$ of upper and lower interfaces of the layer is obtained. Since the layer adjacent to the metal layer in the embodiment is the layer to be measured n, the upper and lower interfaces of the layer to be measured are the first interface and the second interface. The reflectivity $r_{12}$ of the first interface is $r_{pn}$ obtained in step S604, and the reflectivity $r_{23}$ of the second interface is $r_{nj}$ obtained in step S605. Then, the denominator in the formula is zero, i.e., $1+r_{pn}r_{nj}e^{i2K_n d_n}=0$, thereby obtaining $$d_n = -i\frac{\ln\left|\frac{-1}{r_{pn}r_{nj}}\right|}{2K_n},$$

where i is an imaginary unit, the $K_n$, $r_{pn}$ and $r_{nj}$ respectively obtained in steps S603, S604, and S605 are substituted into the above formula to determine the thickness $d_n$ of the layer to be measured.

According to the thickness measuring method provided in the exemplary embodiment of the disclosure, in a case where the sample to be measured has a single layer structure and the whole sample to be measured is the layer to be measured, placing the sample to be measured between an optical device and a metal layer, adjusting incident light emitted to the light incident surface of the optical device so that an intensity of light exiting the light exit surface of the optical device is less than $10^{-12}$ W/m², thus all or almost all the incident light is absorbed to excite the metal surface plasmon resonance, deriving a formula for calculating the thickness of the layer to be measured using the metal surface plasmon resonance principle and according to the reflection coefficient formula of three-layer medium, and finally calculating the thickness of the layer to be measured by obtaining respective parameter values in each of the formulas successively. In that, despite the thickness, the layer to be measured of any thickness may be obtained by the principle of exciting the metal surface plasmon resonance by incident light, and the thickness of the layer to be measured may be derived and calculated according to optical formulas among reflection, refraction and incidence. Compared with current measuring methods, this method can obtain a more accurate result and s higher precision.

Figure 9:
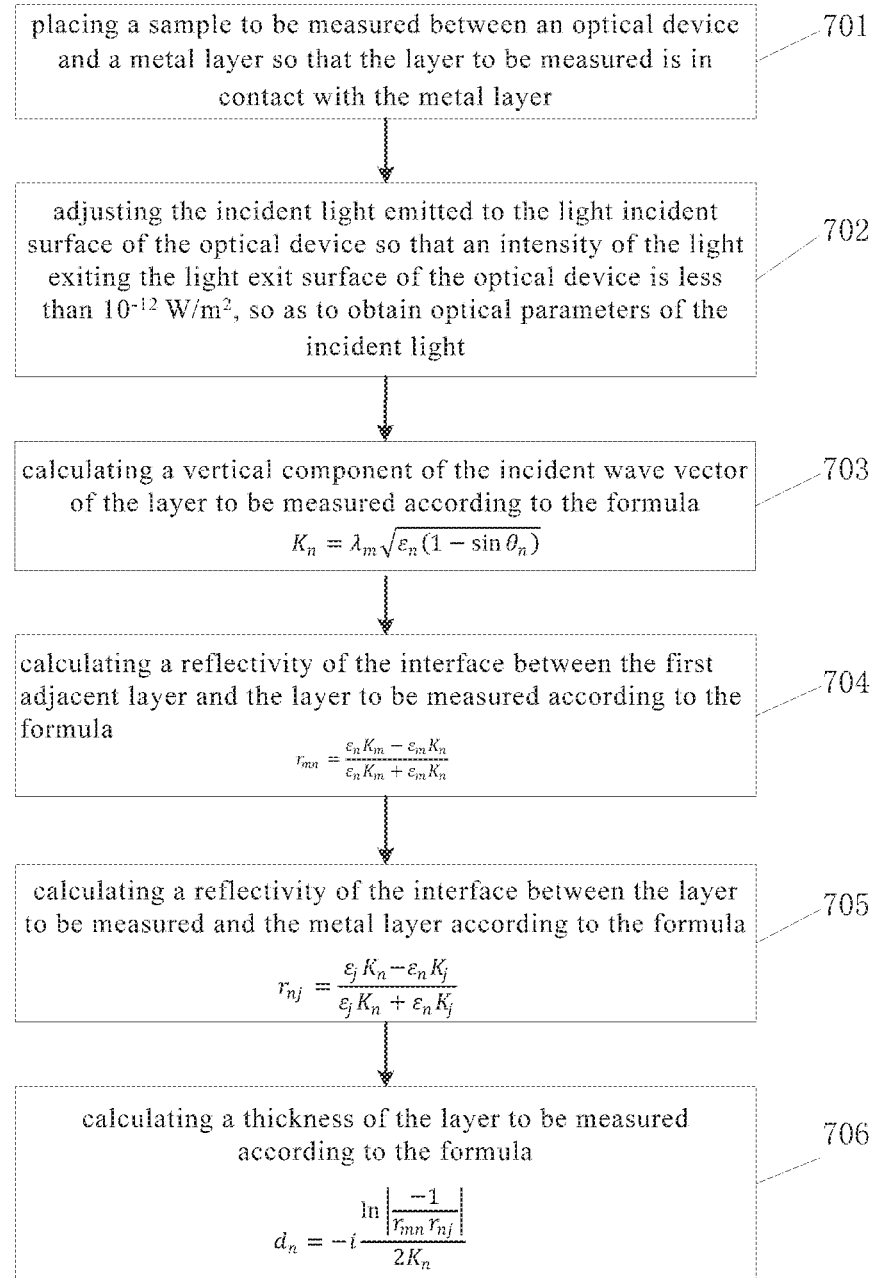
FIG. 9 is a flowchart of yet another thickness measuring method according to an exemplary embodiment of the disclosure.

In the configuration of FIG. 4, the sample to be measured has a multi-layer structure and the layer to be measured is located at an outermost layer of the sample to be measured. For this configuration, the exemplary embodiment of the disclosure further provides a thickness measuring method. As shown in FIG. 9, the method comprises steps S701-S706.

In the step of S701, placing the sample to be measured between the optical device and the metal layer so that the layer to be measured is in contact with the metal layer.

A layer of the sample to be measured adjacent to the layer to be measured is a first adjacent layer, and the metal layer is a second adjacent layer.

In the step of S702, adjusting incident light emitted to the light incident surface of the optical device so that an intensity of light exiting the light exit surface of the optical device is less than $10^{-12}$ W/m², so as to obtain optical parameters of the incident light.

Details of step 702 are the same as those of step S602 in the above exemplary embodiment, thus will not be repeated here.

In the step of S703, calculating a vertical component of the incident wave vector of the layer to be measured according to the formula $K_n=\lambda_m\sqrt{\varepsilon_n(1-\sin\theta_n)}$.

Where $K_n$ is the vertical component of the incident wave vector of the layer to be measured, i.e., a component of the incident wave vector of the layer to be measured in a direction vertical to a surface of the layer to be measured, $\lambda_m$ is an incident wavelength of the first adjacent layer, $\lambda_m$ is obtained through a relationship among optical reflection, refraction vector and incident vector according to a wavelength $\lambda$ of the incident light, an incident angle of the incident light, a dielectric constant of each layer from the optical device to the metal layer and a thickness of each layer other than the layer to be measured, $\theta_n$ is an incident angle of the light incident on the layer to be measured, and $\varepsilon_n$ is a dielectric constant of the layer to be measured.

The principle of deriving the formula $K_n=\lambda_m\sqrt{\varepsilon_n(1-\sin\theta_n)}$ based on the Fresnel reflection coefficient formula is the same as that described in step S603 in the above exemplary embodiment, thus will not be repeated here.

In the step of S704, calculating a reflectivity of the interface between the first adjacent layer and the layer to be measured according to the formula $$r_{mn} = \frac{\varepsilon_n K_m - \varepsilon_m K_n}{\varepsilon_n K_m + \varepsilon_m K_n}.$$

Where $r_{mn}$ is the reflectivity of the interface between the first adjacent layer and the layer to be measured, $K_m$ is a vertical component of the incident wave vector of the first adjacent layer, i.e., a component of the incident wave vector of the first adjacent layer in a direction vertical to a surface of the first adjacent layer, $K_n$ the vertical component of the incident wave vector of the layer to be measured, $\varepsilon_n$ a dielectric constant of the layer to be measured, and $\varepsilon_m$ is a dielectric constant of the first adjacent layer.

In the step of S705, calculating a reflectivity of the interface between the layer to be measured and the metal layer according to the formula $$r_{nj} = \frac{\varepsilon_j K_n - \varepsilon_n K_j}{\varepsilon_j K_n + \varepsilon_n K_j}.$$

Where $r_{nj}$ is the reflectivity of the interface between the layer to be measured and the metal layer, $K_j$ is a vertical component of the incident wave vector of the metal layer, i.e., a component of the incident wave vector of the metal layer in a direction vertical to a surface of the metal layer, and $\varepsilon_j$ is a dielectric constant of the metal layer.

The order of steps S704 and S705 is not specifically defined; and the above two formulas are other expressions of the basic formula of the Fresnel reflection coefficient. The vertical component $K_m$ of the incident wave vector of the first adjacent layer may be obtained by $K_m=\lambda_s\sqrt{\varepsilon_m(1-\sin\theta_m)}$, where $\lambda_s$ is an incident wavelength of a layer which is adjacent to the first adjacent layer and is not the layer to be measured, for example, when the first adjacent layer is adjacent to the optical device, $\lambda_s$ is the wavelength $\lambda$ of the incident light, $\varepsilon_m$ is a dielectric constant of the first adjacent layer, $\theta_m$ is the incident angle of the light incident on the first adjacent layer, and a value of the vertical component $K_j$ of the incident wave vector of the metal layer is the same as the value of the $K_j$ in step S605 of the above exemplary embodiment, which will not be repeated here. The vertical component $K_m$ of the incident wave vector of the first adjacent layer, the vertical component $K_n$ of the incident wave vector of the layer to be measured, the vertical component $K_j$ of the incident wave vector of the metal layer, and the dielectric constant required in the formula are respectively substituted into the above two formulas to respectively obtain the reflectivities of the first second interfaces of the layer to be measured, i.e., the reflectivity $r_{mn}$ of the interface between the first adjacent layer and the layer to be measured and the reflectivity $r_{nj}$ of the interface between the layer to be measured and the metal layer.

In the step of S706, calculating a thickness of the layer to be measured according to the formula $$d_n = -i \frac{\ln\left|\frac{-1}{r_{mn}r_{nj}}\right|}{2K_n}.$$

Where $d_n$ is the thickness of the layer to be measured. According to the reflection coefficient formula of three-layer medium $$r_{123} = \frac{r_{12} + r_{23}e^{i2K_2 d_2}}{1 + r_{12}r_{23}e^{i2K_2 d_2}},$$

when the metal surface plasmon resonance occurs, the denominator in the formula is zero, and thus a relationship between a thickness $d_2$ of a layer adjacent to the metal layer and reflectivities $r_{12}$, $r_{23}$ of upper and lower interfaces of the layer is obtained. Since the layer adjacent to the metal layer in the embodiment is the layer to be measured n, the upper and lower interfaces of the layer to be measured are the first interface and the second interface. The reflectivity $r_{12}$ of the first interface is the reflectivity $r_{mn}$ of the interface between the first adjacent layer and the layer to be measured obtained in step S704, and the reflectivity $r_{23}$ of the second interface is the reflectivity $r_{nj}$ of the interface between the layer to be measured and the metal layer obtained in step S705. Then, the denominator in the formula is zero, i.e., $1+r_{mn}r_{nj}e^{i2K_n d_n}=0$, thereby obtaining $$d_n = -i \frac{\ln\left|\frac{-1}{r_{mn}r_{nj}}\right|}{2K_n},$$

where i is an imaginary unit, and the $K_n$, $r_{mn}$ and $r_{nj}$ respectively obtained in steps S703, S704, and S705 are substituted into the above formula to determine the thickness $d_n$ of the layer to be measured.

According to the thickness measuring method provided in the exemplary embodiment of the disclosure, in a case where the sample to be measured has a multi-layer structure and the layer to be measured is located at an outermost layer of the sample to be measured, placing the sample to be measured between an optical device and a metal layer, where the layer to be measured is in contact with the metal layer, adjusting incident light emitted to the light incident surface of the optical device so that an intensity of light exiting the light exit surface of the optical device is less than $10^{-12}$ W/m², thus all or almost all the incident light is absorbed to excite the metal surface plasmon resonance, deriving a formula for calculating the thickness of the layer to be measured using the metal surface plasmon resonance principle and according to the reflection coefficient formula of three-layer medium, and finally calculating the thickness of the layer to be measured by obtaining respective parameter values in each of the formulas successively. In that, despite the thickness, the layer to be measured of any thickness may be obtained by the principle of exciting the metal surface plasmon resonance by incident light, and the thickness of the layer to be measured may be derived and calculated according to optical formulas among reflection, refraction and incidence. Compared with current measuring methods, this method can obtain a more accurate result and a higher precision.

Figure 10:
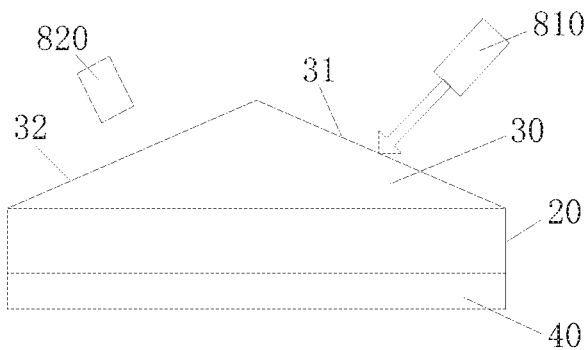
FIG. 10 is a structural schematic view showing a thickness measuring device according to an exemplary embodiment of the disclosure.
Figure 11:
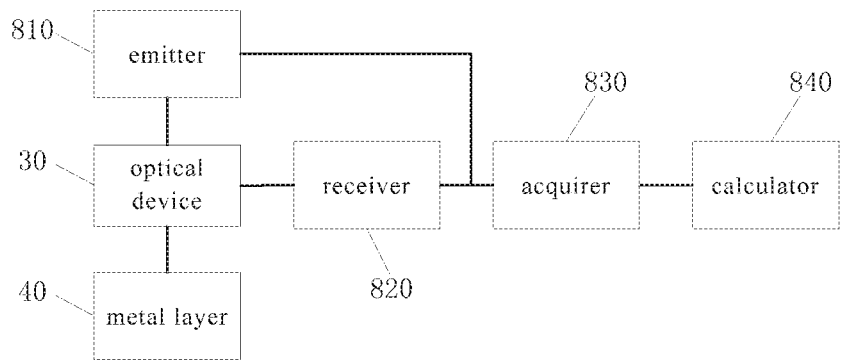
FIG. 11 is a block view showing components of a thickness measuring device according to an exemplary embodiment of the disclosure.

According to another aspect of the disclosure, as an implementation of the above method, the exemplary embodiment of the disclosure further provides a thickness measuring device for measuring a thickness of a layer to be measured of a light-transmitting sample to be measured. As shown in FIGS. 10 and 11, the device includes an optical device 30 and a metal layer 40 disposed oppositely, an emitter 810, a receiver 820, an acquirer 830 and a calculator 840.

The optical device 30 includes a light incident surface 31 and a light exit surface 32. During thickness measurement of the layer to be measured, a sample to be measured 20 is placed between the optical device 30 and the metal layer 40.

The emitter 810 corresponds to the light incident surface of the optical device 30 and is configured to emit incident light toward the light incident surface 31. The emitter 810 may be a component emitting light in a light emitting device. The emitter 810 emits light of a certain wavelength and irradiated to the light incident surface 31 of the optical device 30 at a certain incident angle.

The receiver 820 corresponds to the light exit surface 32 of the optical device 30, and is configured to receive an intensity of light exiting the light exit surface 32.

In the exemplary embodiment of the disclosure, the emitter 810 may be a laser, more specifically, a gas laser, a solid laser, a semiconductor laser, a dye laser, a free electron laser, or the like. In this case, the receiver 820 may be a laser detector. Or, the emitter 810 may be a combination of a light emitting diode and a condenser, in which case the receiver 820 may be a photodetector or the like.

The acquirer 830 is configured to acquire optical parameters of the incident light from the emitter 810 when the receiver 820 receives an intensity of light exiting the light exit surface less than $10^{-12}$ W/m².

When the emitter 810 emits incident light with a fixed wavelength, the acquirer 830 may use a beam analyzer to measure the incident angle of the incident light, or when light emitted from the emitter 810 at an initial position is vertical to the light incident surface 31, the acquirer 830 measures a rotation angle of the emitter 810 with an angle sensor so as to obtain the incident angle of the incident light. When the emitter 810 emits incident light with a fixed incident angle to the light incident surface 31, the acquirer 830 may obtain a wavelength of the incident light by a light wavemeter or a spectrometer, or when the emitter 810 changes the wavelength of the emitted light, the acquirer 830 uses a CPU to read the corresponding changed parameters and obtains a wavelength of the incident light through the corresponding parameters. In the exemplary embodiments of the disclosure, the acquirer 830 may be implemented by a DSP or embedded chip. However, the acquirer 830 of the disclosure is not limited thereto, but may be any other device or obtaining circuit capable of obtaining data from other apparatus or devices.

The calculator 840 is configured to calculate a thickness of the layer to be measured according to the optical parameters of the incident light. Specifically, the calculator 840 may be a CPU or computer, be connected to the acquirer 830 and configured to calculate the thickness of the layer to be measured according to the optical parameters obtained by the acquirer 830. It should be noted that when the acquirer 830 is a CPU, the acquirer 830 may also be used as the calculator 840 which, after obtaining the optical parameters of the incident light, substitutes the optical parameters of the incident light into the corresponding optical formula to calculate the thickness of the layer to be measured. In the exemplary embodiment of the disclosure, the calculator 840 may be implemented by a DSP or embedded chip. However, the calculator 840 of the disclosure is not limited thereto, but may be any other device or calculating circuit capable of calculation.

Figure 12:
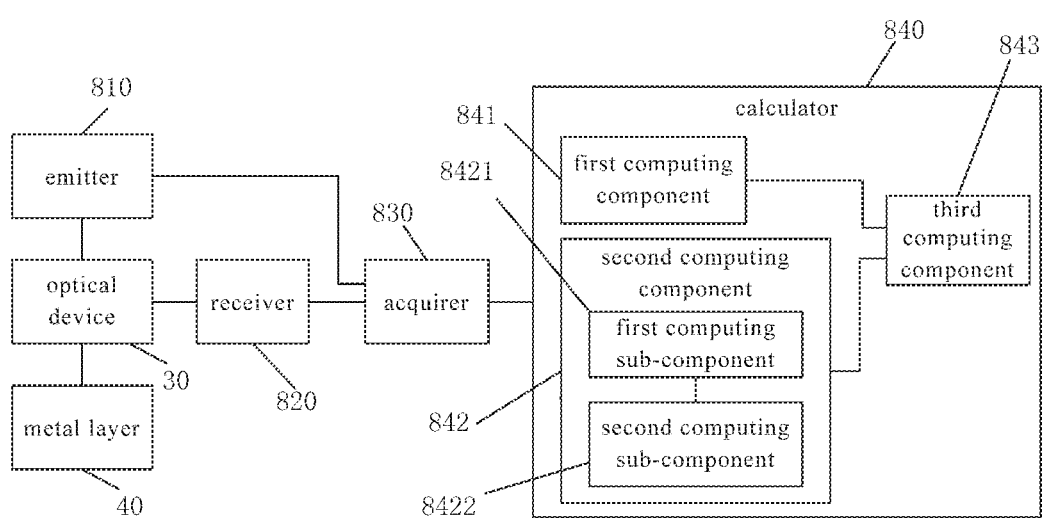
FIG. 12 is a block view showing components of another thickness measuring device according to an exemplary embodiment of the disclosure.

As shown in FIG. 12, the calculator 840 includes:

a first computing component 841 configured to calculate an incident wave vector of the layer to be measured according to the optical parameters of the incident light;

a second computing component 842 configured to calculate a reflectivity of a first interface and a reflectivity of a second interface of the layer to be measured, respectively, where the layer to be measured includes a first surface facing the optical device and a second surface facing the metal layer, the first surface is in contact with a first adjacent layer, the second surface is in contact with a second adjacent layer, the first interface is an interface between the layer to be measured and the first adjacent layer, and the second interface is an interface between the layer to be measured and the second adjacent layer;

a third computing component 843 configured to calculate a thickness of the layer to be measured according to the incident wave vector of the layer to be measured obtained by the first computing component 841 and the reflectivities of the first and second interfaces of the layer to be measured obtained by the second computing component 842.

In the exemplary embodiment of the disclosure, when the sample to be measured has a single layer structure and the whole sample to be measured is the layer to be measured, the optical device is the first adjacent layer, and the metal layer is the second adjacent layer.

The first computing component 841 is configured to calculate a vertical component of the incident wave vector of the layer to be measured according to a formula $K_n = \lambda \sqrt{\varepsilon_n(1-\sin\theta_n)}$, where $K_n$ is the vertical component of the incident wave vector of the layer to be measured, $\lambda$ is a wavelength of the incident light, $\theta_n$ is an incident angle of the light incident on the layer to be measured, and $\varepsilon_n$ is a dielectric constant of the layer to be measured.

In the exemplary embodiment of the disclosure, the second computing component 842 includes:

a first computing sub-component 8421 configured to calculate a reflectivity of an interface between the optical device and the layer to be measured according to a formula $$r_{pn} = \frac{\varepsilon_n K - \varepsilon_p K_n}{\varepsilon_n K + \varepsilon_p K_n},$$

where $r_{pn}$ is the reflectivity of the interface between the optical device and the layer to be measured, $K_n$ is a vertical component of the incident wave vector of the layer to be measured, K is a vertical component of the incident wave vector of the optical device, $\varepsilon_p$ is a dielectric constant of the optical device, and $\varepsilon_n$ is a dielectric constant of the layer to be measured; and a second computing sub-component 8422 configured to calculate a reflectivity of an interface between the layer to be measured and the metal layer according to a formula $$r_{nj} = \frac{\varepsilon_j K_n - \varepsilon_n K_j}{\varepsilon_j K_n + \varepsilon_n K_j},$$

where $r_{nj}$ is the reflectivity of the interface between the layer to be measured and the metal layer, $K_j$ is a vertical component of the incident wave vector of the metal layer, and $\varepsilon_j$ is a dielectric constant of the metal layer.

In the exemplary embodiment of the disclosure, the third computing component 843 is configured to calculate the thickness of the layer to be measured according to a formula $$d_n = -i\frac{\ln\left|\frac{-1}{r_{pn}r_{nj}}\right|}{2K_n},$$

where $d_n$ is the thickness of the layer to be measured, and i is an imaginary unit.

Figure 13:
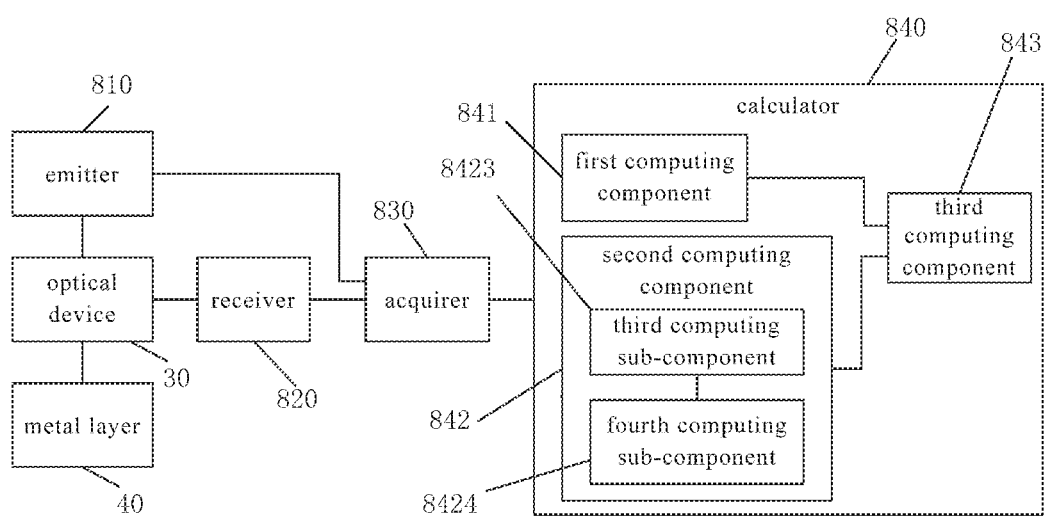
FIG. 13 is a block view showing components of yet another thickness measuring device according to an exemplary embodiment of the disclosure.

In another exemplary embodiment of the disclosure, as shown in FIG. 13, the sample to be measured has a multi-layer structure, the layer to be measured is located at an outermost layer of the sample to be measured and in contact with the metal layer, a layer of the sample to be measured adjacent to the layer to be measured is the first adjacent layer, and the metal layer is the second adjacent layer.

The first computing component 841 is configured to calculate a vertical component of the incident wave vector of the layer to be measured according to a formula $K_n = \Delta_m \sqrt{\varepsilon_n(1-\sin\theta_n)}$, where $K_n$ is the vertical component of the incident wave vector of the layer to be measured, $\lambda_m$ is an incident wavelength of the first adjacent layer, $\theta_n$ is an incident angle of the light incident on the layer to be measured, and $\varepsilon_n$ is a dielectric constant of the layer to be measured.

In the exemplary embodiment of the disclosure, the second computing component 842 includes:

a third computing sub-component 8423 configured to calculate a reflectivity of an interface between the first adjacent layer and the layer to be measured according to a formula $$r_{mn} = \frac{\varepsilon_n K_m - \varepsilon_m K_n}{\varepsilon_n K_m + \varepsilon_m K_n},$$

where $r_{mn}$ is the reflectivity of the interface between the first adjacent layer and the layer to be measured, $K_m$ is a vertical component of the incident wave vector of the first adjacent layer, $K_n$ is a vertical component of the incident wave vector of the layer to be measured, $\varepsilon_n$ is a dielectric constant of the layer to be measured, and $\varepsilon_m$ is a dielectric constant of the first adjacent layer; and a fourth computing sub-component 8424 configured to calculate a reflectivity of an interface between the layer to be measured and the metal layer according to a formula $$r_{nj} = \frac{\varepsilon_j K_n - \varepsilon_n K_j}{\varepsilon_j K_n + \varepsilon_n K_j},$$

where $r_{nj}$ is the reflectivity of the interface between the layer to be measured and the metal layer, $K_j$ is a vertical component of the incident wave vector of the metal layer, and $\varepsilon_j$ is a dielectric constant of the metal layer.

In the exemplary embodiment of the disclosure, the third computing component 843 is configured to calculate the thickness of the layer to be measured according to a formula $$d_n = -i \frac{\ln\left|\frac{-1}{r_{mn}r_{nj}}\right|}{2K_n},$$

where $d_n$ is the thickness of the layer to be measured, and i is an imaginary unit.

In the exemplary embodiments of the disclosure, as shown in FIG. 10, the optical device 30 is a prism. The prism may implement a triangular prism having a light incident surface being a plane so that the incident angle of incident light may be easily determined, and the triangular prism is conveniently machined and manufactured.

In the exemplary embodiment of the disclosure, the metal layer 40 is made of any one or more metal materials selected from the group consisting of gold, silver, aluminum, copper, nickel, platinum, palladium, zinc and cadmium. Specifically, the metal layer 40 may be made of any single one of, or an alloy combined by any two or more of, the above metal materials. The above metal materials are materials suitable for optical measurements.

The exemplary embodiment of the disclosure provides a thickness measuring device for measuring a thickness of a layer to be measured of a light-transmitting sample to be measured. The specific measurement process includes: placing the sample to be measured between an optical device and a metal layer, adjusting incident light emitted to the light incident surface of the optical device so that an intensity of light exiting the light exit surface of the optical device is less than $10^{-12}$ W/m$^2$, thus all or almost all the light energy of the incident light interacts with free electrons on the metal surface of the metal layer to excite the metal surface plasmon resonance, and deriving and calculating the thickness of the layer to be measured of the sample to be measured according to the metal surface plasmon resonance principle and the optical parameters of the incident light, as well as optical formulas among reflection, refraction and incidence. In that, despite the thickness, the layer to be measured of any thickness may be obtained by the principle of exciting the metal surface plasmon resonance by incident light, and the thickness of the layer to be measured may be derived and calculated according to optical formulas among reflection, refraction and incidence. Compared with current measuring methods, this device can obtain a more accurate result and a higher precision.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A thickness measuring method for measuring a thickness of a layer to be measured of a light-transmitting sample to be measured, comprising the steps of:

placing the sample to be measured between an optical device and a metal layer, the optical device comprising a light incident surface and a light exit surface;

adjusting incident light emitted to the light incident surface of the optical device so that an intensity of light exiting from the light exit surface of the optical device is less than $10^{-12}$ W/m$^2$, so as to obtain optical parameters of the incident light, wherein the incident light is transmitted through the sample to be measured to the metal layer, and reflected to the light exit surface of the optical device from the metal layer; and calculating a thickness of the layer to be measured according to the optical parameters of the incident light, wherein the step of calculating a thickness of the layer to be measured according to the optical parameters of the incident light comprises:

calculating an incident wave vector of the layer to be measured according to the optical parameters of the incident light;

calculating a reflectivity of a first interface and a reflectivity of a second interface of the layer to be measured, respectively, wherein the layer to be measured includes a first surface facing the optical device and a second surface facing the metal layer, the first surface is in contact with a first adjacent layer, the second surface is in contact with a second adjacent layer, the first interface is an interface between the layer to be measured and the first adjacent layer, and the second interface is an interface between the layer to be measured and the second adjacent layer; and calculating a thickness of the layer to be measured according to the incident wave vector of the layer to be measured and the reflectivities of the first and second interfaces of the layer to be measured.

2. The thickness measuring method according to claim 1, wherein the sample to be measured has a single layer structure and the sample to be measured is the layer to be measured, the optical device is the first adjacent layer, and the metal layer is the second adjacent layer;

the step of calculating an incident wave vector of the layer to be measured according to the optical parameters of the incident light comprises:

calculating a vertical component of the incident wave vector of the layer to be measured according to a formula $K_n = \lambda \varepsilon_n \sqrt{(1-\sin\theta_n)}$, where $K_n$ is the vertical component of the incident wave vector of the layer to be measured, $\lambda$ is a wavelength of the incident light, $\theta_n$ is an incident angle of the light incident on the layer to be measured, and $\varepsilon_n$ is a dielectric constant of the layer to be measured.

3. The thickness measuring method according to claim 2, wherein the step of respectively calculating a reflectivity of a first interface and a reflectivity of a second interface of the layer to be measured comprises:

calculating a reflectivity of an interface between the optical device and the layer to be measured according to a formula $$r_{pn} = \frac{\varepsilon_n K - \varepsilon_p K_n}{\varepsilon_n K + \varepsilon_p K_n},$$

where $r_{pn}$ is the reflectivity of the interface between the optical device and the layer to be measured, $K_n$ is a vertical component of the incident wave vector of the layer to be measured, $K$ is a vertical component of the incident wave vector of the optical device, $\varepsilon_p$ is a dielectric constant of the optical device, and $\varepsilon_n$ is a dielectric constant of the layer to be measured; and calculating a reflectivity of an interface between the layer to be measured and the metal layer according to a formula $$r_{nj} = \frac{\varepsilon_j K_n - \varepsilon_n K_j}{\varepsilon_j K_n + \varepsilon_n K_j},$$

where $r_{nj}$ is the reflectivity of the interface between the layer to be measured and the metal layer, $K_j$ is a vertical component of the incident wave vector of the metal layer, and $\varepsilon_j$ is a dielectric constant of the metal layer.

4. The thickness measuring method according to claim 3, wherein
the step of calculating a thickness of the layer to be measured according to the incident wave vector of the layer to be measured and the reflectivities of the first and second interfaces of the layer to be measured comprises:
calculating the thickness of the layer to be measured according to a formula $$d_n = -i \frac{\ln \left| \frac{-1}{r_{pn} r_{nj}} \right|}{2 K_n},$$

where $d_n$ is the thickness of the layer to be measured, and i is an imaginary unit.

5. The thickness measuring method according to claim 1, wherein the sample to be measured has a multi-layer structure, and the layer to be measured is located at an outermost layer of the sample to be measured;
the sample to be measured is placed between the optical device and the metal layer so that the layer to be measured is in contact with the metal layer;
wherein a layer of the sample to be measured adjacent to the layer to be measured is the first adjacent layer, and the metal layer is the second adjacent layer.

6. The thickness measuring method according to claim 5, wherein
the step of calculating an incident wave vector of the layer to be measured according to the optical parameters of the incident light comprises:
calculating a vertical component of the incident wave vector of the layer to be measured according to a formula $K_n = \lambda_m \sqrt{(\varepsilon_n(1-\sin\theta_n))}$, where $K_n$ is the vertical component of the incident wave vector of the layer to be measured, $\lambda_m$ is an incident wavelength of the first adjacent layer, $\theta_n$ is an incident angle of the light incident on the layer to be measured, and $\varepsilon_n$ is a dielectric constant of the layer to be measured.

7. The thickness measuring method according to claim 6, wherein
the step of respectively calculating a reflectivity of a first interface and a reflectivity of a second interface of the layer to be measured comprises:

calculating a reflectivity of an interface between the first adjacent layer and the layer to be measured according to a formula $$r_{mn} = \frac{\varepsilon_n K_m - \varepsilon_m K_n}{\varepsilon_n K_m + \varepsilon_m K_n},$$

where $r_{mn}$ is the reflectivity of the interface between the first adjacent layer and the layer to be measured, $K_m$ is a vertical component of the incident wave vector of the first adjacent layer, $K_n$ is a vertical component of the incident wave vector of the layer to be measured, $\varepsilon_n$ is a dielectric constant of the layer to be measured, and $\varepsilon_m$ is a dielectric constant of the first adjacent layer; and calculating a reflectivity of an interface between the layer to be measured and the metal layer according to a formula $$r_{nj} = \frac{\varepsilon_j K_n - \varepsilon_n K_j}{\varepsilon_j K_n + \varepsilon_n K_j},$$

where $r_{nj}$ is the reflectivity of the interface between the layer to be measured and the metal layer, $K_j$ is a vertical component of the incident wave vector of the metal layer, and $\varepsilon_j$ is a dielectric constant of the metal layer.

8. The thickness measuring method according to claim 7, wherein
the step of calculating a thickness of the layer to be measured according to the incident wave vector of the layer to be measured and the reflectivities of the first and second interfaces of the layer to be measured comprises:
calculating the thickness of the layer to be measured according to a formula $$d_n = -i \frac{\ln \left| \frac{-1}{r_{mn} r_{nj}} \right|}{2 K_n},$$

where $d_n$ is the thickness of the layer to be measured, and i is an imaginary unit.

9. A thickness measuring device for measuring a thickness of a layer to be measured of a light-transmitting sample to be measured, comprising:
an optical device and a metal layer disposed oppositely, the optical device comprising a light incident surface and a light exit surface, wherein incident light is transmitted through the sample to be measured to the metal layer, and reflected to the light exit surface of the optical device from the metal layer;
an emitter corresponding to the light incident surface of the optical device and configured to emit the incident light toward the light incident surface;
a receiver corresponding to the light exit surface of the optical device and configured to receive an intensity of light exiting from the light exit surface;
an acquirer configured to acquire optical parameters of the incident light from the emitter in a case where the receiver receives an intensity of light exiting from the light exit surface less than $10^{-12}$ W/m$^2$; and
a calculator configured to calculate the thickness of the layer to be measured according to the optical parameters of the incident light, wherein the calculator comprises:
a first computing component configured to calculate an incident wave vector of the layer to be measured according to the optical parameters of the incident light;
a second computing component configured to calculate a reflectivity of a first interface and a reflectivity of a second interface of the layer to be measured, respectively, wherein the layer to be measured includes a first surface facing the optical device and a second surface facing the metal layer, the first surface is in contact with a first adjacent layer, the second surface is in contact with a second adjacent layer, the first interface is an interface between the layer to be measured and the first adjacent layer, and the second interface is an interface between the layer to be measured and the second adjacent layer; and
a third computing component configured to calculate the thickness of the layer to be measured according to the incident wave vector of the layer to be measured obtained by the first computing component and the reflectivities of the first and second interfaces of the layer to be measured obtained by the second computing component.

10. The thickness measuring device according to claim 9, wherein
when the sample to be measured has a single layer structure and the sample to be measured is the layer to be measured, the optical device is the first adjacent layer, and the metal layer is the second adjacent layer;
the first computing component is configured to calculate a vertical component of the incident wave vector of the layer to be measured according to a formula $K_n = \lambda \sqrt{\varepsilon_n(1-\sin\theta_n)}$, where $K_n$ is the vertical component of the incident wave vector of the layer to be measured, $\lambda$ is a wavelength of the incident light, $\theta_n$ is an incident angle of the light incident on the layer to be measured, and $\varepsilon_n$ is a dielectric constant of the layer to be measured.

11. The thickness measuring device according to claim 10, wherein the second computing component comprises:
a first computing sub-component configured to calculate a reflectivity of an interface between the optical device and the layer to be measured according to a formula $$r_{pn} = \frac{\varepsilon_n K - \varepsilon_p K_n}{\varepsilon_n K + \varepsilon_p K_n},$$

where $r_{pn}$ is the reflectivity of the interface between the optical device and the layer to be measured, $K_n$ is the vertical component of the incident wave vector of the layer to be measured, K is a vertical component of the incident wave vector of the optical device, $\varepsilon_p$ is a dielectric constant of the optical device, and $\varepsilon_n$ is a dielectric constant of the layer to be measured; and
a second computing sub-component configured to calculate a reflectivity of an interface between the layer to be measured and the metal layer according to a formula $$r_{nj} = \frac{\varepsilon_j K_n - \varepsilon_n K_j}{\varepsilon_j K_n + \varepsilon_n K_j},$$

where $r_{nj}$ is the reflectivity of the interface between the layer to be measured and the metal layer, $K_j$ is a vertical component of the incident wave vector of the metal layer, and $\varepsilon_j$ is a dielectric constant of the metal layer.

12. The thickness measuring device according to claim 11, wherein
the third computing component is configured to calculate the thickness of the layer to be measured according to a formula $$d_n = -i \frac{\ln\left|\frac{-1}{r_{pn}r_{nj}}\right|}{2K_n},$$

where $d_n$ is the thickness of the layer to be measured, and i is an imaginary unit.

13. The thickness measuring device according to claim 9, wherein
the sample to be measured has a multi-layer structure, and the layer to be measured is located at an outermost layer of the sample to be measured, the layer to be measured is in contact with the metal layer, a layer of the sample to be measured adjacent to the layer to be measured is the first adjacent layer, and the metal layer is the second adjacent layer;
the first computing component is configured to calculate a vertical component of the incident wave vector of the layer to be measured according to a formula $K_n = \lambda \sqrt{\varepsilon_m(1-\sin\theta_n)}$, where $K_n$ is the vertical component of the incident wave vector of the layer to be measured, $\lambda_m$ is an incident wavelength of the first adjacent layer, $\theta_n$ is an incident angle of the light incident on the layer to be measured, and $\varepsilon_n$ is a dielectric constant of the layer to be measured.

14. The thickness measuring device according to claim 13, wherein the second computing component comprises:
a third computing sub-component configured to calculate a reflectivity of an interface between the first adjacent layer and the layer to be measured according to a formula $$r_{mn} = \frac{\varepsilon_n K_m - \varepsilon_m K_n}{\varepsilon_n K_m + \varepsilon_m K_n},$$

where $r_{mn}$ is the reflectivity of the interface between the first adjacent layer and the layer to be measured, $K_m$ is a vertical component of the incident wave vector of the first adjacent layer, $K_n$ is the vertical component of the incident wave vector of the layer to be measured, $\varepsilon_n$ is a dielectric constant of the layer to be measured, and $\varepsilon_m$ is a dielectric constant of the first adjacent layer; and
a fourth computing sub-component configured to calculate a reflectivity of an interface between the layer to be measured and the metal layer according to a formula $$r_{nj} = \frac{\varepsilon_j K_n - \varepsilon_n K_j}{\varepsilon_j K_n + \varepsilon_n K_j},$$

where $r_{nj}$ is the reflectivity of the interface between the layer to be measured and the metal layer, $K_j$ is a vertical component of the incident wave vector of the metal layer, and $\varepsilon_j$ is a dielectric constant of the metal layer.

15. The thickness measuring device according to claim 14, wherein
the third computing component is configured to calculate the thickness of the layer to be measured according to a formula $$d_n = -i\frac{\ln\left|\frac{-1}{r_{mn}r_{nj}}\right|}{2K_n},$$

where $d_n$ is the thickness of the layer to be measured, and i is an imaginary unit.

16. The thickness measuring device according to claim 9, wherein
the optical device is a prism.

17. The thickness measuring device according to claim 16, wherein
the metal layer is made of any one or more metal materials selected from the group consisting of gold, silver, aluminum, copper, nickel, platinum, palladium, zinc and cadmium.

18. The thickness measuring device according to claim 9, wherein
the incident light is emitted onto a metal surface of the metal layer to excite surface plasmon resonance so that the intensity of light exiting from the light exit surface is less than $10^{-12}$ W/m$^2$.

* * * * *